United States Patent [19]

Johnson

[11] Patent Number: 4,546,269

[45] Date of Patent: Oct. 8, 1985

[54] METHOD AND APPARATUS FOR OPTIMALLY TUNING CLOCK SIGNALS FOR DIGITAL COMPUTERS

[75] Inventor: Gerald H. Johnson, White Bear Lake, Minn.

[73] Assignee: Control Data Corporation, Minneapolis, Minn.

[21] Appl. No.: 557,024

[22] Filed: Dec. 1, 1983

[51] Int. Cl.³ .............................................. H03K 5/13
[52] U.S. Cl. .................................... 307/269; 364/900
[58] Field of Search ............... 307/269, 200 A, 109; 364/900

[56] References Cited

U.S. PATENT DOCUMENTS

| | | | |
|---|---|---|---|
| 3,617,889 | 11/1971 | Rabinowitz | 325/30 |
| 4,101,761 | 7/1982 | Merrymun | 235/92 CA |
| 4,290,022 | 9/1981 | Puckette | 328/55 |
| 4,295,098 | 10/1981 | Crowley | 328/24 |
| 4,337,433 | 6/1982 | Yoshimura | 328/55 |
| 4,338,569 | 7/1982 | Petrich | 325/155 |
| 4,366,540 | 12/1982 | Berglund et al. | 364/200 |
| 4,379,265 | 4/1983 | Catiller | 328/55 |
| 4,435,757 | 3/1984 | Pross | 364/200 |
| 4,490,821 | 12/1984 | Lacher | 364/900 |

Primary Examiner—Stanley D. Miller
Assistant Examiner—K. Ohralik
Attorney, Agent, or Firm—William J. McGinnis; Joseph A. Genovese

[57] ABSTRACT

In a first searching mode of the control program for the microprocessor, the microprocessor starts with a selected clock input and associated delay circuit and sets the delay circuit to an initial clocking point which is intermediate to the minimum and maximum delay points. The microprocessor then, at each pass of the control program, successively increments the delay period interposed by the delay circuit to cause the clock pulse to arrive later and later in time at the clock input until the associated circuit fails, to indicate the late clocking failure limit. In the second searching mode of the microprocessor control program, the microprocessor starts at the late clocking failure limit and at each subsequent pass of the program successively decrements the delay period interposed by the delay circuit to cause the clock signal to arrive earlier and earlier in time until the semiconductor device fails again, to indicate the early clocking failure limit. The early clocking failure limit and the late clocking failure limit together define the clocking window for the semiconductor device. The microprocessor sets the delay circuit to the mid-point of the clocking window which is the optimal clocking point for the particular clock input. The microprocessor repeats this procedure for each delay circuit and associated clock input to optimize the clocking of all of the logic circuits and thereby optimize computer performance during the normal operating mode of the computer.

16 Claims, 5 Drawing Figures

METHOD AND APPARATUS FOR OPTIMALLY TUNING CLOCK SIGNALS FOR DIGITAL COMPUTERS

BACKGROUND

The invention relates to methods and apparatus for providing clock signals to the various clock using locations of a digital computer.

In the past, in synchronous computers, the object of the clock circuitry has been to clock all the clock-using locations at the same instant in time, known as "$T_o$", as nearly as possible. Each clock-using location has a clocking window within which the clock signal can arrive and still enable the associated logic circuit to function. Optimally, the clocking point will be centered in the clocking window of the circuit. However, due to various factors, such as normal process variations in the manufacture of semiconductor devices and printed circuit boards and design inacuracies, $T_o$ may be at the center of the clocking window or may be near to one or the other of the extremities of the window. If $T_o$ is near to one of the window extremities, a transient of one sort or another within the circuit can move the clock pulse outside of the clocking window and cause the logic device associated with the clocked input to fail.

SUMMARY

The method and apparatus of the present invention overcome the shortcomings of the prior art by going beyond the standard industry practice of attempting to clock each clock-using location at $T_o$. Instead, a delay circuit under the control of a microprocessor is interposed between the clock source and each clock-using location. The delay circuit is varied earlier and later in time than $T_o$ in accordance with the control program of the microprocessor to determine the clocking window for each clock input. The microprocessor then sets the delay circuitry for each clock input to cause the clock pulse to strike at the center of the clocking window for the clock input during the normal operating mode of the computer. The center of the clocking window is the optimal clocking point for the clock input and associated logic circuit.

DESCRIPTION OF THE PRESENTLY PREFERRED EMBODIMENT OF THE INVENTION

Figure 1:
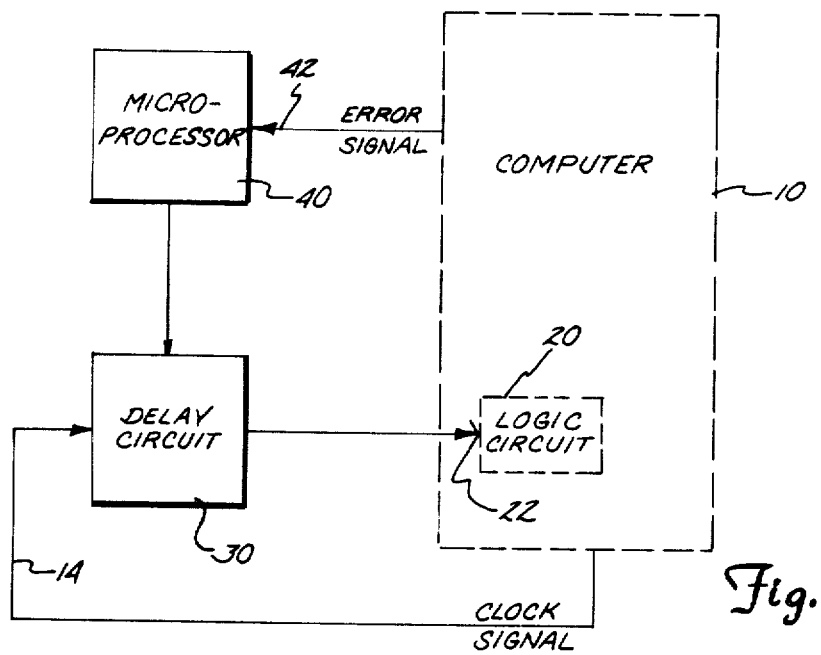
FIG. 1 shows a schematic diagram of the invention.

The method and apparatus comprising the present invention can be described in the simplest form with reference to FIG. 1. The computer 10 (figuratively shown) has a logic circuit 20 (also figuratively shown). The circuit 20 has a clock input 22. Computer 10 includes a clock signal generator (not shown) which supplies a clock signal to a delay circuit 30 by means of a clock signal input line 14. Delay circuit 30 is interposed between the clock signal generator and the clock input 22 to the logic circuit 20. Note that only one clocked logic circuit of the computer is shown for simplicity in explanation, but as will be better explained later on, the invention is applicable to all of the clocked logic circuits of the computer.

A microprocessor 40 controls the period of time which the delay circuit 30 delays the clock signal before allowing it to arrive at the clock input 22. The microprocessor 40 varies the period of time that the clock signal is delayed between an earliest clocking point in which the signal is delayed for the minimum period of time while still enabling logic circuit 20 to operate, and the latest clocking point in which the signal is delayed for the maximum period of time while still enabling logic circuit 20 to operate.

Figure 2:
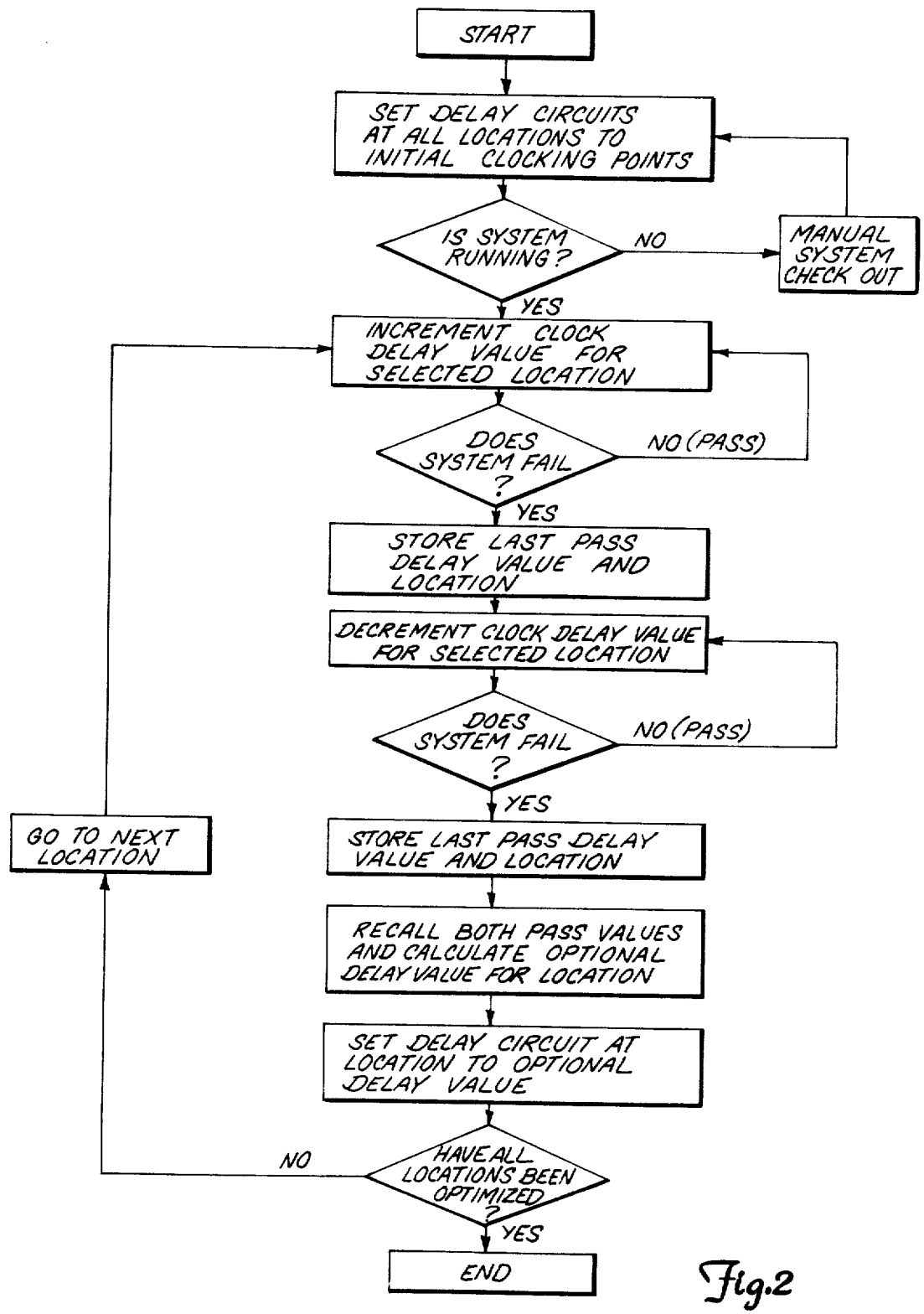
FIG. 2 shows a flow chart for the control program for microprocessor 40.

The control program for microprocessor 40 is shown in FIG. 2. The program initially sets the delay circuit 30 for each clock-using input at an initial clocking point (corresponding to $T_o$ in the prior devices) which is between the earliest clocking point and the latest clocking point for each clock input. The program then ensures that the system is running since the system must be running while the clock inputs are being optimized. If the system is not running it must go through manual checkout to determine the problem. Assuming that the system is running, the processor initiates a first search mode for the selected clock-using location by successively incrementing the amount of delay interposed by delay circuit 30 at each successive pass until the system fails. Once the failure occurs the current delay value is stored as the late clocking failure limit value. Note that in FIG. 1, an error signal is provided from the computer 10 to the microprocessor 40 at an input 42 to indicate the failure of logic circuit 20. Once the late clocking failure limit value is determined and stored, the microprocessor initiates a second search mode, starting with the late clocking failure limit and successively reducing the amount of delay interposed by delay circuit 30 at each pass until the system fails again. This failure point indicates the early clocking failure limit value and is also stored. Again, the failure is indicated to microprocessor 40 from computer 10 at the input 42. Having determined the early clocking failure limit and late clocking failure limit, the microprocessor 40 has defined the clocking window for clock input 22 and the associated logic circuit 20. Clock pulses which are timed to fall within this clocking window enable the circuit 20 to operate satisfactorily, while clock pulses which fall outside of the clocking window cause the circuit 20 to fail. Having determined the late and early clocking failure limits, the microcomputer 40 calculates the optimal clocking point which is centered in the clocking window. Microprocessor 40 thereupon sets delay circuitry 30 to this optimal clocking point for the normal operating mode of the computer. Assuming that each clock-using location is equipped with a delay circuit 30, microprocessor 40 progresses to the next clock-using location in the program and repeats the above procedure to determine the optimal clocking point for that location. The delay circuitry 30 for the location is then set to the optimal clocking point before the program moves to the next location. Once all of the clock-using locations have been optimized in this way, the program terminates.

Figure 3:
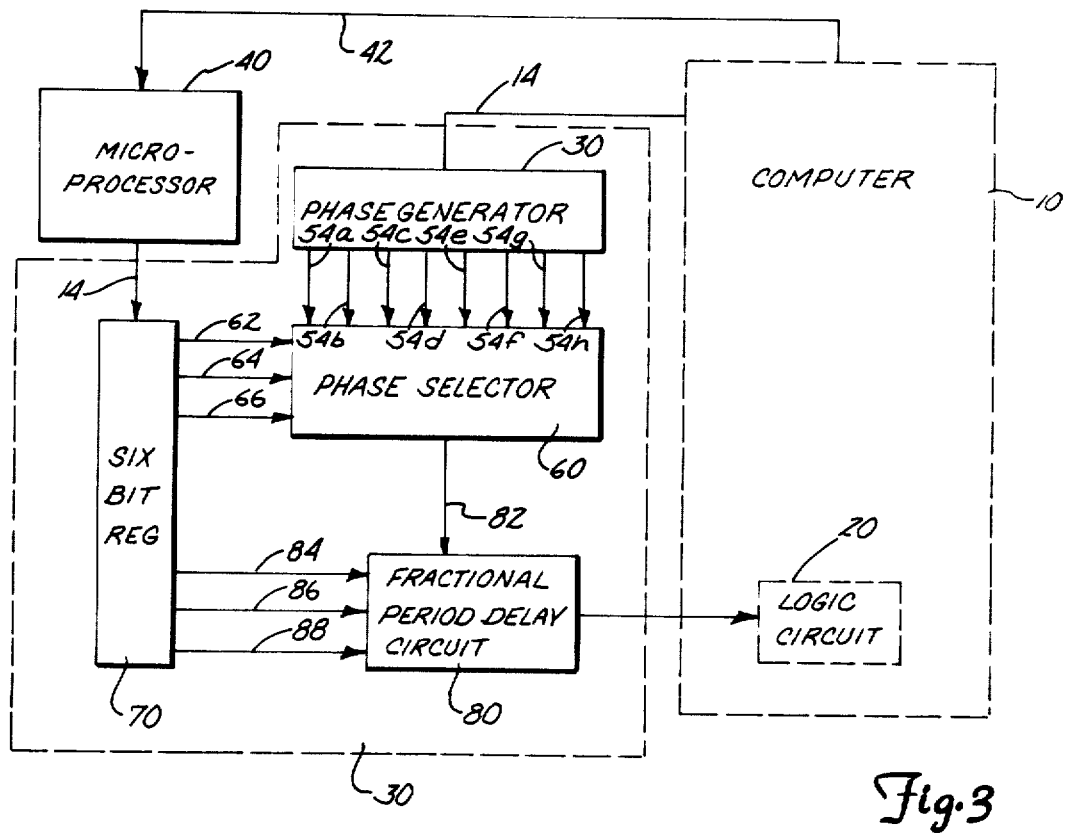
FIG. 3 shows a schematic diagram of the invention including a more detailed schematic diagram of one way in which the delay circuitry 30 could be implemented.

Having described the invention in general with reference to FIGS. 1 and 2, reference is now made to FIG. 3, wherein one manner of implementing delay circuitry 30 is shown.

The clock signal input 14 from computer 10 provides the clock signal to a phase generator 50, which generates a plurality of phases from the input clock signal 14. Such phase generators are well known in the art. Reference is made, for example, to U.S. Pat. No. 4,290,022, which is hereby incorporated by reference. In the present embodiment, eight clock phases, 54a-54h, are generated by phase generator 50. Each of the phases is 360°/8=45° out of phase with respect to the next. Thus, assuming that the first phase 54a is in phase, or 0° out of phase; phase 54b would be 45° out of phase with respect to phase 54a; phase 54c would be 90° out of phase with respect to phase 54a; phase 54d would be 135° out of phase with respect to phase 54a, and so on, culminating with the last phase 54h, which would be 315° out of phase with the first phase 54a.

Figure 4:
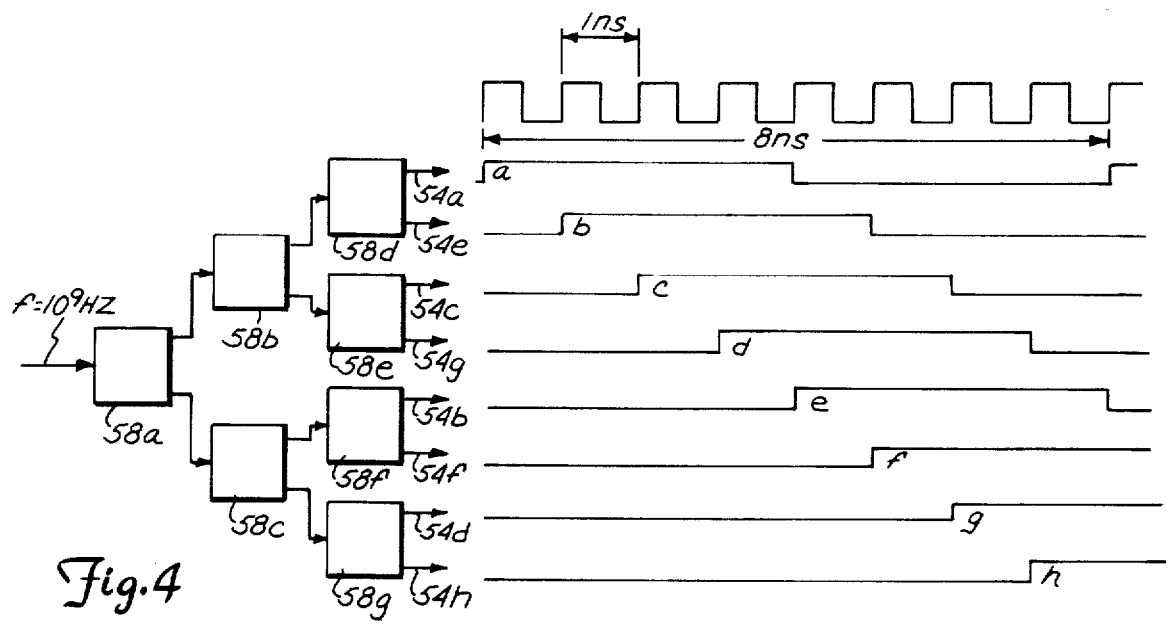
FIG. 4 is a schematic diagram showing the manner in which the phase generator processes the incoming clock signals into eight clock phases.

With reference to FIG. 4, if we assume the master clock signal supplied by the clock signal generator has a frequency of $10^9$ Hz, the signal would have a period of 1 nanosecond. Assuming, as shown in FIG. 4, that phase generator 50 utilizes seven$\div$2 frequency dividers, 58a-58h, to generate the eight clock phases, the $10^9$ Hz master clock signal frequency would be effectively divided by eight so that each clock phase would have a frequency of 125 Mhz and a period of 8 nanoseconds. Consequently, each of the eight phases 54a-54h would be spaced 1 nanoseconds apart. Therefore, by means of the phase generator 50 we can produce 1 nanosecond resolution between the eight clock phases 54a-54h.

The eight phases 54a-54h are input to a phase selector 60, in FIG. 3, which is a conventional device having three digital inputs 62, 64, 66 to select one of the eight phases 54a-54h. In the present embodiment, a digital input of 0-0-0 will select the phase 54a; 0-0-1 will select phase 54b; 0-1-0 will select phase 54c, and so on, concluding with digital input 1-1-1 which will select phase 54h.

The three bits 62, 64 and 66 are provided by the upper three bits of a six bit register 70, which is loaded via an input 74 by microprocessor 40 under the control of its control program.

The selected phase from among the phases 54a-54h is then provided to a fractional period delay circuit 80 via output 82 of phase selector 60. Fractional period delay circuit 80 is designed to provide selectable fractional delays at increments of ⅛ nanosecond of from 0 nanoseconds to 7/8 nanoseconds as determined by the three lower bits 84-86-88 of register 70. One way of implementing the circuitry 80 is shown in FIG. 5.

Figure 5:
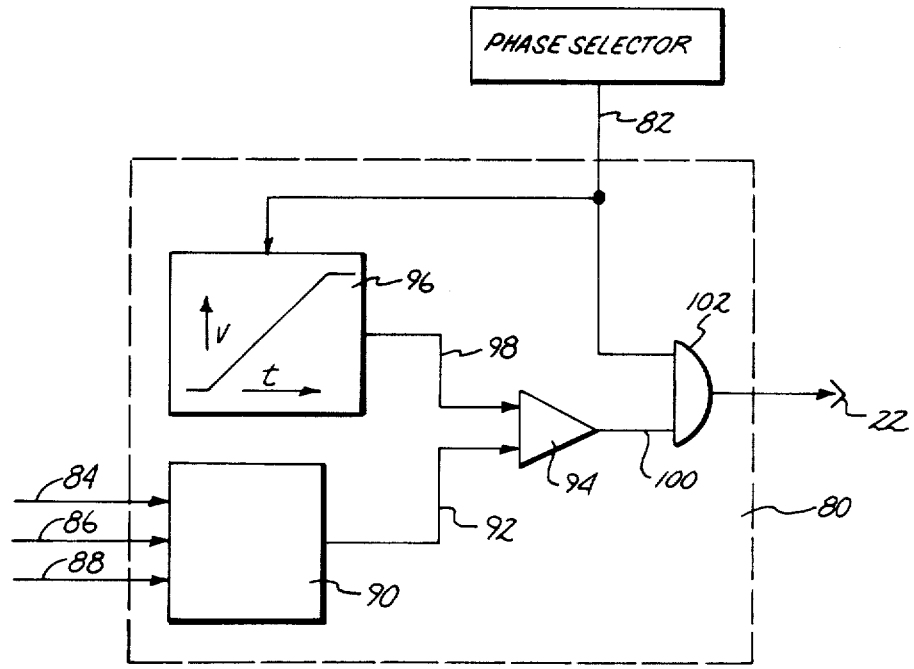
FIG. 5 shows a schematic diagram of one way in which the fractional period delay circuiry 80 can be implemented.

As shown in FIG. 5, the three bits 84-86-88 are input to a digital to analog converter 90 which converts the three bits of data into a representative voltage at its output 92 which drives one input of a comparator 94. The range of voltage generated by the digital to analog converter 90 from the bits 0-0-0 to the bits 1-1-1 corresponds to the 1 nanosecond range of a ramp generator 96. Ramp generator 96 has an output 98 which drives the other input of comparator 94. The arrival of a clock signal at input 82 from phase selector 60 initiates ramp generator 96 and once the voltage of ramp generator 96 at its output 98 equals the output 92 of the digital analog converter 94, output 100 of comparator 94 goes high to enable AND gate 102 to allow the clock signal to pass to the clock input 22.

The data 0-0-0 at inputs 84, 86, 88 produce a 0 nanosecond delay; 0-0-1 produces a ⅛ nanosecond delay; 0-1-0 produces a ¼ nanosecond delay; 0-1-1 produces a ⅜ nanosecond delay, etc., concluding with 1-1-1 which produces a ⅞ nanosecond delay.

Hence, in addition to the 1 nanosecond resolution given by the 8 phases of phase generator 50 and phase selector 60, we, in addition, now achieve a ⅛ nanosecond resolution using the fractional period delay circuitry 80 of FIG. 5. Fractional period delay circuitry 80 selectively provides fractional periods of the 1 nanosecond timing increment between the phases starting with minimum fractional period of 0 nanoseconds, corresponding to the 0-0-0 data, concluding with the maximum fractional period of ⅞ nanoseconds corresponding to the 1-1-1 data.

The six bits which are loaded into the six bit register 70 by microprocessor 40 under the direction of its control program thus first choose between the 1 nanosecond increments of the eight phases at phase selector 60, and then choose among the eight ⅛ nanosecond separated fractional delay periods provided by fractional delay circuit 80.

Consequently, using the embodiment shown in FIG. 4, delay circuitry 30 can produce at ⅛ nanosecond increments any delay ranging from the minimum delay period (i.e., where the first phase 54a and the minimum fractional period are chosen) to the maximum delay (i.e., where the last phase 54h and the maximum fractional period are chosen). In the present embodiment, therefore, the minimum delay period is 0 nanoseconds, corresponding to the data 0-0-0, 0-0-0 and the maximum delay period of 7⅞ nanoseconds, corresponding to the data 1-1-1, 1-1-1. Hence, the earliest clocking point corresponds to 0 nanoseconds delay and the latest clocking point corresponds to 7⅞ nanoseconds delay in this embodiment of delay circuitry 30.

According to the method of the invention described generally above with reference to FIG. 2, microprocessor 40 loads a first six bit digital word into shift register 70 which represents the initial clocking point, $T_o$, which is located between the earliest clocking point and the latest clocking point. Microprocessor 40 then initiates the first search mode wherein at each pass the clocking point is moved later and later in time, at ⅛ nanosecond intervals, by incrementing the six bit digital control word until the system fails, to indicate the late clocking failure limit. The six bit word corresponding to this late clocking failure limit is stored. Microprocessor 40 then starts from this six bit word representing the late clocking failure limit and at each subsequent pass decrements the six bit word to move the clocking point earlier and earlier in time at ⅛ nanosecond increments until the system fails again, to indicate the early clocking failure limit. The six bit word repesenting the early clocking failure limit is stored. Microprocessor 40 then determines the six bit word representing the optimal clocking point which is centered in the clocking window defined by the early clocking failure limit and the late clocking failure limit. Microprocessor 40 loads this six bit word, representing the optimal clocking point, into delay circuitry 30 for the normal operating mode of the computer.

Assuming that each clock-using location in the computer has an associated delay circuit 30, the microprocessor then moves to the next clock-using location in its control program and repeats the above procedure to determine the six bit optimal clocking point for that particular clock-using location. This six bit word is then loaded into the delay circuitry 30 for the particular clock-using location and the computer moves on to the next clock-using location, and so on. The procedure is repeated until the optimal clocking point has been determined for each clock-using location and the six bit word representative thereof has been loaded into the delay circuitry 30 for each clock-using location. Now that the method and apparatus of the present invention have optimized the clocking of all clock-using locations, the computer is ready to commence its normal mode of operation.

While the present embodiment utilizes a six bit word to provide resolution of ⅛ nanosecond, obviously a higher frequency clock signal and a word having a greater number of bits could be used to provide even greater resolution.

Moreover, obviously, various other methods could be employed to interpose variable delay between the clock source and the clock-using locations and the invention is not intended to be limited to the particular embodiment disclosed.

The delay circuitry 30 for each clock input could be provided on a separate board or could even be designed right onto the chip to be clocked itself. In either case, transmission line length is made less of a factor and a convenient length for the transmission lines can be chosen to greatly simplify circuit design.

In addition to optimizing the performance of the computer, other benefits and advantages are also realized. Where a particular clock-using logic circuit fails, the microprocessor and associated delay circuitry can be used to re-tune the clock signal to the optimal clocking point for the replacement circuit. Whereas in the past such re-tuning, if even possible, had to be done in the field using imprecise methods; using the present invention, the clock can be re-tuned merely by using a microprocessor and re-tuning control program to achieve a degree of timing precision equal to that which is provided by the manufacturer.

Another important advantage resides in the fact that each computer system of a particular model is slightly different from the next. Consequently, clocking each clock-using location of each separate computer at $T_o$ is certain to result in a less than optimal performance. The invention, by permitting the individualized optimal clocking of each clock-using location within each separate computer, provides for far greater precision in clocking, and thereby, optimizes computer performance.

Having described the presently preferred embodiment of the method and apparatus of the present invention, it will be obvious to those skilled in the art that many variations and modifications could be made, and accordingly, the invention is intended to be limited only by the scope of the appended claims.

I claim:

1. In a computer having a clock source for generating a clock signal and a logic circuit having a clock input, a method for determining an optimal clocking point for the arrival of said clock signal at said clock input, comprising the steps of:
    (a) inputting said clock signal into a means for delaying said clock signal a variable period of time between an earliest clocking point wherein the clock signal is delayed for a minimum period of time, and a latest clocking point wherein said clock signal is delayed for a maximum period of time, said delay means being controlled by a controlling means;
    (b) setting said delay means to an initial clocking point between said earliest clocking point and said latest clocking point;
    (c) varying said delay means during a first search mode to cause such clock signal to arrive at said clock input later and later in time with respect to said initial clocking point until said logic circuit fails so as to indicate a late clocking failure limit;
    (d) varying said delay means during a second search mode to cause said clock signal to arrive at said clock input earlier and earlier in time with respect to said initial clocking point until said logic circuit fails, so as to indicate an early clocking failure limit;
    (e) determining an optimal clocking point between said early clocking failure limit and said late clocking failure limit;
    (f) setting said delay means to said optimal clocking point for the normal operating mode of the computer.

2. The method of claim 1, wherein during step (d) said optimal clocking point is determined to be mid-way between said early clocking failure limit and said late clocking failure limit.

3. The method of claim 1, wherein said computer has a plurality of logic circuits having clock inputs, and wherein steps (a)–(f) are repeated for some or all of said clock inputs.

4. The method of claim 3, wherein said control means is a microprocessor under the control of a control program.

5. The method of claim 1, wherein said delay means is digitally controlled by said controlling means, and wherein: in step (b) a first digital word representing said initial clocking point is input to said delay means by said controlling means; in step (c) said delay means is varied during said first search mode by digital words successively input into said delay means until said logic circuit fails, so as to determine said late clocking failure limit, the digital word representing said late clocking failure limit comprising a second digital word and being stored by said controlling means; in step (d) said delay means is varied during said second search mode by digital word sucessively input into said delay means from said controlling means until said logic circuit fails, so as to indicate said early clocking failure limit, the digital word representing said early clocking failure limit comprising a third digital word and being stored by said controlling means; in step (e) said second digital word and said third digital word are utilized to generate a fourth digital word representing said optimal clocking point; and in step (f) said fourth digital word is input into said delay means to set said delay means at said optimal clocking point for the normal operating mode of said computer.

6. The method of claim 5, wherein said fourth digital word represents an optimal clocking point which is mid-way between said early clocking failure limit and said late clocking failure limit.

7. The method of claim 6, wherein said computer has a plurality of logic circuits having clock inputs, and wherein steps (a)–(f) are repeated for of said clock inputs.

8. The method of claim 7, wherein said controlling means is a microprocessor under the control of a control program.

9. In a computer having a clock signal source and a logic circuit having a clock input, an apparatus for optimizing the timing of the clock signal supplied to said clock input, comprising:

a delay means interposed between said clock signal source and said clock input, said delay means being variable to vary the period of time said clock signal is delayed between an earliest clocking point wherein the signal is delayed for minimum period of time and a latest clocking point wherein said signal is delayed for a maximum period of time; and a means for controlling said delay means to selectively choose a selected clocking point between said earliest clocking point and said latest clocking point, said controlling means successively selecting amongst a range of clocking points between said earliest clocking point and said latest clocking point in order to determine a clocking window for said clock input of said logic circuit, wherein said logic circuit is operative for clocking points falling within said clocking window but fails for clocking points outside of said clocking window, said controlling means selecting an optimal clocking point within said clocking window and setting said delay means at said optimal clocking point for the normal operating mode of the comparator.

10. The apparatus of claim 9, wherein said controlling means initially sets said delay means at an initial clocking point between said earliest clocking point and said latest clocking point and initiates a first search mode by successsively selecting clocking points later and later in time with respect to said initial clocking point until said logic circuit fails, so as to indicate a late clocking failure limit; said controlling means also initiating a second search mode by successively selecting clocking points earlier and earlier in time with respect to said initial clocking point until said logic circuit fails, so as to indicate an early clocking failure limit, said controlling means utilizing said early clocking failure limit and said late clocking failure limit to select said optimal clocking point between said late clocking failure limit and said early clocking failure limit, and setting said delay means at said optimal clocking point for the normal operating mode of the computer.

11. The apparatus of claim 10, wherein said optimal clocking point is centered between said early clocking failure limit and said late clocking failure limit.

12. The apparatus of claim 10, wherein said computer has a plurality of logic circuits having clock inputs, said inputs having one of said delay means associated therewith, and wherein said controlling means determines said optimal clocking point for said clock inputs having one of said associated delay means.

13. The apparatus of claim 12, wherein said controlling means is a microprocessor under the control of a control program.

14. The apparatus of claim 10, wherein said delay means comprises: a means for generating a plurality of phases of a master clock signal starting with a first phase and ending with a last phase, said phases being separated from one another by a first timing increment; a means for selecting one of said phases from among said plurality of phases under the control of said controlling means; and a fractional period delay circuit which is controllable by said control means to vary the delay experienced by whichever of said phases is selected a fractional period of said first timing increment between a minimum fractional period of zero delay and a maximum fractional period nearly equal to said first timing increment, said delay means having a minimum delay period wherein said controlling means selects said first phase and said minimum fractional delay period, and a maximum delay period wherein said controlling means selects said last phase and said maximum fractional delay period; said initial clocking input falling between said minimum delay period and said maximum delay period, said earliest clocking point comprising said minimum delay period and said latest clocking point comprising said maximum delay period; in said first search mode, said controlling means controlling said phase selector and said fractional delay circuit to cause said clock signal to arrive at said clock input later and later in time with respect to said initial clocking point to determine said late clocking failure limit; in said second mode said controlling means controlling said phase selector and said fractional delay circuit to cause said clock signal to arrive at said clock input earlier and earlier in time relative to said initial clocking pont to determine said early clocking failure limit; said controlling means utilizing said early clocking failure limit and said late clocking failure limit to determine said optimal clocking point, said optimal clocking point being centered between said early clocking failure limit and said late clocking failure limit; said controlling means controlling said phase selector and said fractional delay circuit to produce said optimal clocking point during the normal operating mode of said computer.

15. The apparatus of claim 14, wherein said controlling means comprises a microprocessor controlled by a control program, and said phase selector and said fractional portion delay circuit are controlled by digital words supplied by said microprocessor.

16. The apparatus of claim 15, wherein said computer has a plurality of logic circuits having clock inputs, said clock inputs having one of said delay means associated therewith, and wherein said controlling means determines said optimal clocking point for each of said clock inputs having one of said associated delay means.

* * * * *